United States Patent [19]

Cole

[11] 4,208,820
[45] Jun. 24, 1980

[54] SIGN FOR DISABLED MOTORIST

[76] Inventor: Edwin L. Cole, P.O. Box 135, Jasper, Oreg. 97401

[21] Appl. No.: 928,956

[22] Filed: Jul. 28, 1978

[51] Int. Cl.² ............................................. G09F 21/04
[52] U.S. Cl. ...................................... 40/591; 40/530; 40/536
[58] Field of Search ................ 40/591, 592, 593, 530, 40/533, 536, 532, 534, 535, 617, 612, 606, 588, 589, 590

[56] References Cited

U.S. PATENT DOCUMENTS

| 786,271 | 4/1905 | Desmarais | 40/533 |
| 2,431,108 | 11/1947 | Carleton et al. | 40/591 |
| 2,816,377 | 12/1957 | Hastings | 40/591 |
| 2,945,594 | 7/1960 | Parker | 40/536 X |
| 3,218,743 | 11/1965 | Shneider | 40/530 X |
| 3,448,536 | 6/1969 | Alter | 40/533 |
| 3,455,044 | 7/1969 | Falconbridge et al. | 40/591 |
| 3,623,254 | 11/1971 | Parish | 40/591 |
| 4,062,139 | 12/1977 | Klösel | 40/533 |
| 4,132,022 | 1/1979 | Wood | 40/591 |

*Primary Examiner*—John F. Pitrelli
*Attorney, Agent, or Firm*—James D. Givnan, Jr.

[57] ABSTRACT

A sign for use by the driver of a stalled vehicle. The sign includes bendable members for sign attachment to a vehicle. A multitude of signs are supported by a rod in a manner permitting flipping of the signs until the appropriate message is found. A tie extends through the signs to prevent fluttering of same by wind gusts.

1 Claim, 2 Drawing Figures

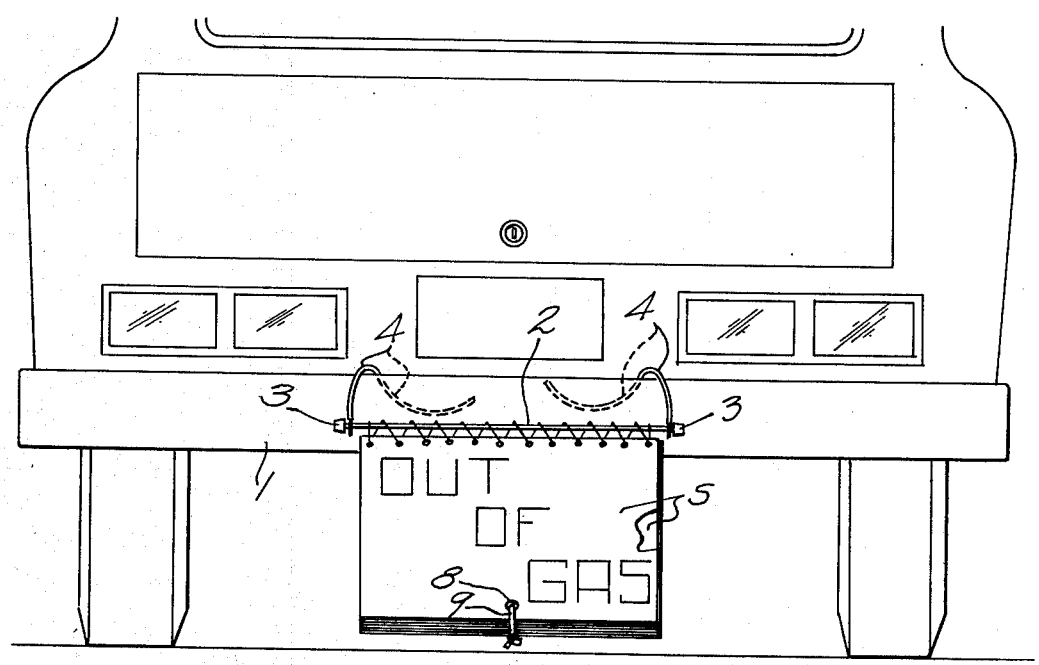
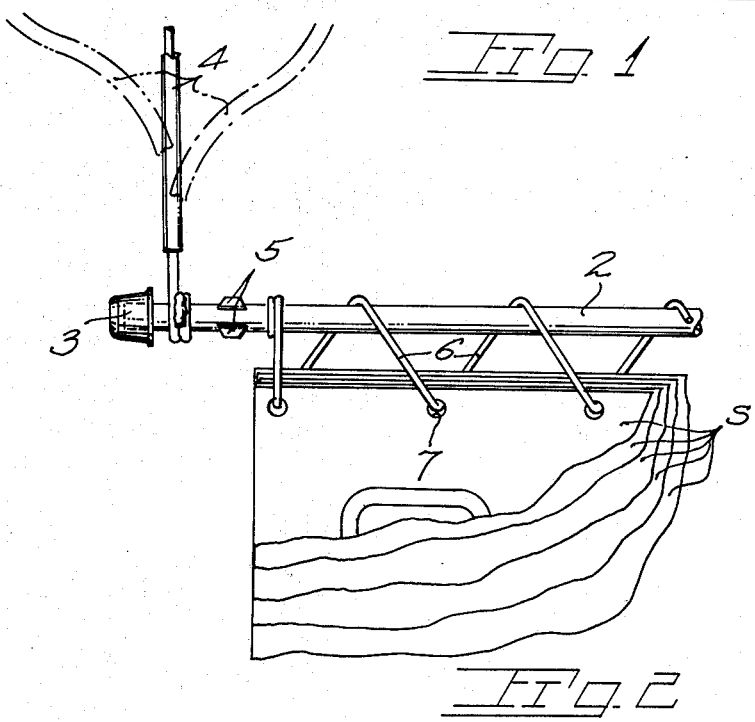

SIGN FOR DISABLED MOTORIST

BACKGROUND OF THE INVENTION

The present invention pertains to that type of sign for temporary attachment to a parked vehicle to notify passing motorists of the nature of the problem encountered by the stalled vehicle and to solicit their help.

It is understood that various sign arrangements have been proposed in the past for the purpose of notifying passing automobile drivers of the type of problem and to seek their assistance. Known signs, however, have a shortcoming in that the same are not adapted for convenient stowage within a small area. Further, the signs provide a very limited number of sign displays thus limiting practical use of such a sign. Additionally, such known signs are not readily attachable to the stalled vehicle. A further drawback to such signs is that they are not operable in inclement weather in view of the same requiring a substantial aount of time to set up and attach to the vehicle. Accordingly, the public has not widely accepted the use of such emergency signs.

SUMMARY OF THE PRESENT INVENTION

The present invention is embodied within a readily installable sign having a large number of printed messages to provide a wide array of distress notifications.

The present sign is supported at its ends by bendable wires which may be manually shaped for purposes of attachment to vehicle structure in an expeditious, secure manner. The wires may be conveniently shaped for secure engagement with various bumper shapes or other portions of the vehicle. A sign support member is in the form of a rod supported at its ends by said flexible wire members with the intermediate portion of the rod serving to receive wire or ring members on which are movably carried a collection of various signs. Each sign has a substantial display area on which is printed, preferably in reflective material, a variety of notices to apprise the passing public of the problem encountered by the stalled motorist. Provision is also made to assure the sign selected remains stationary against the wind or gusts resulting from passing vehicles.

Important objectives include the provision of a distress sign for use by disabled motorists which provides a wide selection of notices to the passing drivers to solicit their assistance; the provision of a sign for use during those times when an automobile is disabled by reason of being out of gas, mechanical problems, flat tires, or physical impairment of the driver; the provision of a road distress sign readily attachable to most all types of vehicles in a moment or two without the need of tools; the provision of a sign easily stowed within a small area.

BRIEF DESCRIPTION OF THE DRAWINGS

In the accompanying drawing:

FIG. 1 is a rear elevational view of a disabled automobile with the present invention in place on its back bumper;

FIG. 2 is an enlarged fragmentary view of the present sign showing sign details.

DETAILED DESCRIPTION OF THE PREFERRED EMBODIMENT

With continuing attention to the drawing, the reference numeral 1 indicates the rear bumper of an automobile disabled for one reason or another and parked along a shoulder of the roadway.

The sign includes a support member 2 shown as a rod several inches in length and fitted at its ends with end caps 3. Adjacent each end of support member 2 is attached a length of bendable or flexible wire at 4 which may be economically and suitably attached by wrapping of same about a rod end. To axially confine the wrapped end of wire 4 in place on rod, said rod may be somewhat deformed as at 5 to provide ear-like obstructions.

Supported by rod 2 is a spiraled wire as at 6, which also may be in the form of separate rings which passes through openings 7 formed in the upper margin of each sign at S. Each of the signs S is further apertured at 8 (FIG. 1) at its bottom margin for the purpose of receiving a tie 9 which secures the sign collection against fluttering in the wind. The tie is inserted and locked as by twisting after selection of the desired sign has been made.

The present invention is so devised as to permit both surfaces of each sign to be utilized for a printed message. Each sign is of a pliable nature, such as cloth or plastic, permitting the same to be jointly rolled or folded to facilitate compact storage within a vehicle trunk. Further, the wording thereon is preferably of the type having reflective characteristics for illumination by passing automobile headlights.

The signs are flipped through one at a time until the desired message is found with support rod 2 thereafter being conveniently attached to vehicle structure such as the bumper as shown by bendable members 4. To prevent damage to vehicle surfaces the bendable members 4 are preferably coated with a resilient plastic material and accordingly insulated electrical wire may be used for such a purpose the same already being manufactured with a resilient coating.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A sign for use by the operator of a disabled vehicle, said sign comprising,
   a rod,
   manually bendable wires one each affixed to each end of said rod and adapted for manual bent engagement with a vehicle component such as the vehicle bumper, said wires are each coated with a resilient material so as to avoid damage to the vehicle surfaces,
   a multitude of signs each of a pliable nature and each displaying a message for the notification of passing motorists as to the nature of the emergency encountered by the disabled vehicle operator, each of said signs defines an aperture, a tie insertable through said aperture to retain the signs against fluttering by the wind, and
   means interconnecting the upper margin of each of said signs with support rod so as to permit sign rotation thereabout enabling selected display of one of said signs, said interconnecting means is in the form of a spiraled wire member.

* * * * *